United States Patent [19]

Edelman et al.

[11] 4,259,719

[45] Mar. 31, 1981

[54] BINARY INPUT PROCESSING IN A COMPUTER USING A STACK

[75] Inventors: Brian S. Edelman, Dearborn; Ralph L. Robinson, Jr., Canton Township, Wayne County, both of Mich.

[73] Assignee: Ford Motor Company, Dearborn, Mich.

[21] Appl. No.: 48,201

[22] Filed: Jun. 13, 1979

[51] Int. Cl.³ ............................................. G06F 3/00
[52] U.S. Cl. ................................................. 364/200
[58] Field of Search ... 364/200 MS File, 900 MS File; 365/73

[56] References Cited

U.S. PATENT DOCUMENTS

| | | | |
|---|---|---|---|
| 3,411,142 | 11/1968 | Lee et al. | 364/900 |
| 3,794,981 | 2/1974 | O'Conner | 364/200 |
| 3,815,096 | 6/1974 | Nahon | 364/900 |
| 3,952,289 | 4/1976 | Baligant | 364/200 |
| 3,990,559 | 11/1976 | Martin et al. | 364/900 X |
| 4,003,031 | 1/1977 | Kashsio | 364/900 |
| 4,024,508 | 5/1977 | Bachman et al. | 364/200 |
| 4,034,349 | 7/1977 | Monaco et al. | 364/200 |
| 4,048,625 | 9/1977 | Harris, Jr. et al. | 364/900 |
| 4,062,059 | 12/1977 | Suzuki et al. | 364/200 |
| 4,125,870 | 11/1978 | Suzuki et al. | 364/900 |

Primary Examiner—Raulfe B. Zache
Attorney, Agent, or Firm—Peter Abolins; Clifford L. Sadler

[57] ABSTRACT

A digital computer having a real time counter and a memory/address bus uses binary input data comprising a plurality of bits of information to generate output information in response to a program. The invention provides improved processing of the binary input data. A transition from one state to another of one or more of the bits of binary input data causes a byte of binary input data containing the bit or bits having undergone transition to be placed in an input holding register. Also, the real time at which the transition occurred is placed in a capture-time holding register. The contents of the input holding and capture-time holding registers are repetitively placed in a stack as pending input data bytes. The pending input data bytes are accessible to the computer central processing unit, as required by the program, via the memory/address bus.

12 Claims, 1 Drawing Figure

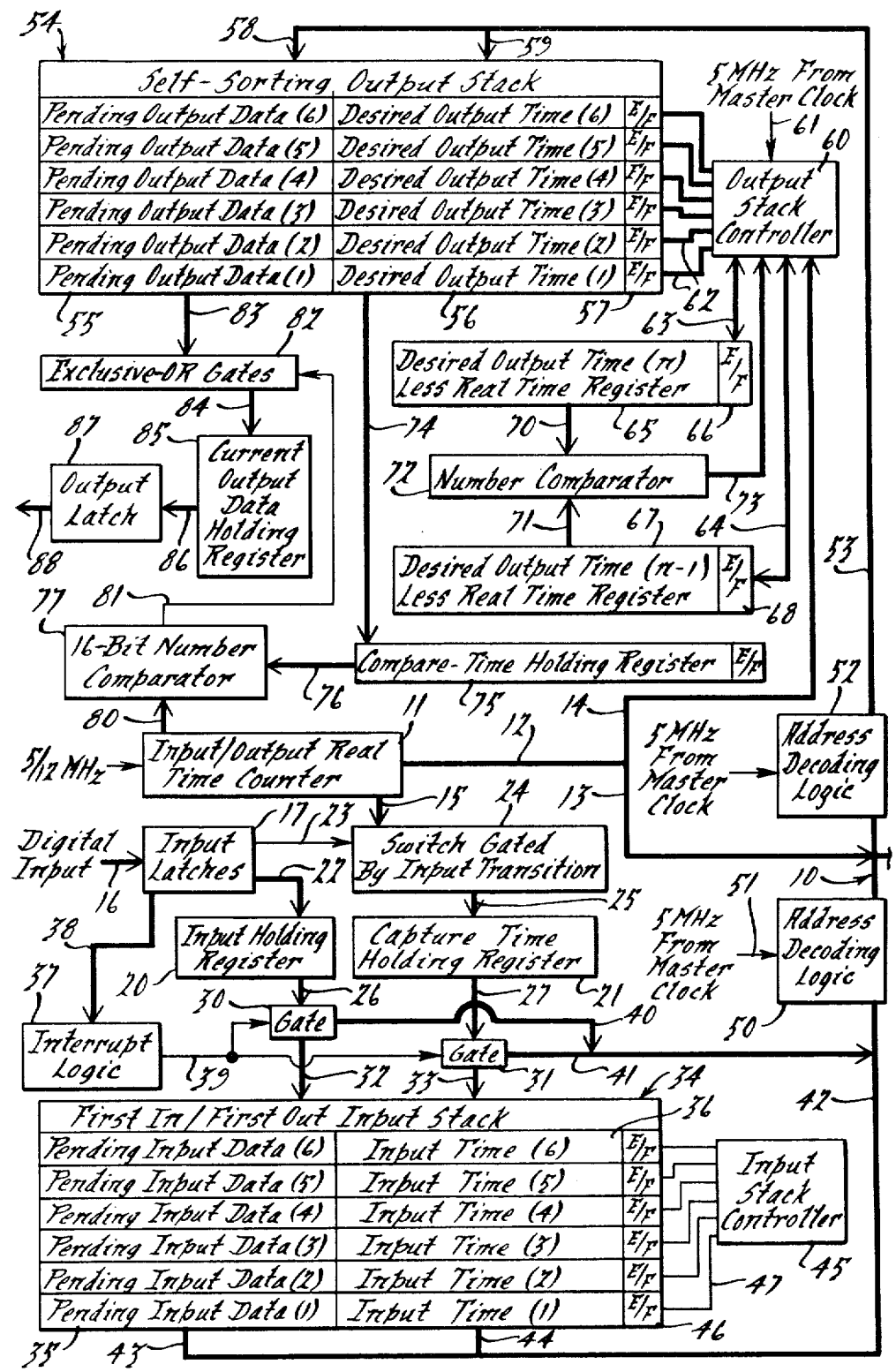

BINARY INPUT PROCESSING IN A COMPUTER USING A STACK

CROSS-REFERENCE TO RELATED APPLICATIONS

This invention is related to the inventors' commonly-assigned and copending applications Ser. No. 48,198 entitled "IMPROVED BINARY OUTPUT PROCESSING IN A DIGITAL COMPUTER" and Ser. No. 48,200 entitled "IMPROVED BINARY INPUT/OUTPUT PROCESSING IN A DIGITAL COMPUTER".

BACKGROUND

This invention relates to improved processing in a digital computer of the binary input data supplied thereto.

Microprocessors and other digital computers perform programmed mathematical and other operations in response to binary input data supplied to the digital computer. A plurality of data input lines may be continuously monitored for the purpose of detecting transitions in any of the input lines. The transitions are a change from one state to another of any of the bits of binary input data represented by the signals applied to the digital computer input lines.

The binary data inputs to the digital computer may, either alone or in combination, represent a quantity, a time, or the occurrence of an event. As an example of the above, consideration may be given to a digital computer used to control an engine in a motor vehicle. There may be in such application, perhaps, eight bits of binary input data supplied on eight separate input lines connected to the digital computer. One of these bits of binary input data may represent a signal which, each quarter revolution of the engine's crankshaft, changes from a logic zero level to a logic one level for a brief time in order to provide information regarding crankshaft position. A second bit of binary input data may be a logic one level only when an air/fuel ratio sensor positioned in the exhaust gas stream from the engine senses an air/fuel mixture excursion across stoichiometry in a rich direction. A third binary input bit may be at a logic one level when the air/fuel ratio sensed by this sensor indicates an air/fuel ratio excursion across stoichiometry iometry in the opposite direction, i.e., toward the lean direction.

An airflow meter may provide a voltage proportional to mass air flow rate. This voltage may be converted to a pulse repetition frequency proportional to the voltage that is indicative of the mass flow rate of air into the engine. This frequency (and hence the air flow rate) may be determined by detection of the pulse transitions if these are represented by a change from a logic zero level to a logic one level. As a fourth bit of binary data input to the digital computer, the pulse transitions relating to air flow rate may be detected. After the occurrence of each transition, a difference between the time of its occurrence and the time of occurrence of the previous transition may be calculated. The reciprocal of this time difference will be equal or proportional to the frequency of the signal supplied as the aforementioned fourth binary data input to the computer. The calculated frequency may be converted, through a program, based on the air flow meter transfer function, to a binary number representing the instantaneous air flow rate into the engine. With this information, the amount of fuel required to be metered to the engine under existing circumstances can be determined. Of course, other analog voltage inputs can be handled in a similar manner.

A fifth binary input bit of data to the digital computer may be obtained from a throttle-demand switch that would indicate the need for substantially increased engine power. A sixth binary bit might indicate the range of a sensor or actuator being used at a given time. The engine, if of the four-cycle type, requires two crankshaft revolutions per complete engine cycle, and a seventh binary input data bit to the digital computer may indicate the onset of a new complete engine cycle. An eighth binary input bit might be used by the digital computer to calculate some other quantity representative of a variable of engine operation, such as engine temperature that may be detected initially as an analog voltage and thereafter converted to pulses having a repetition frequency proportional to the sensed temperature.

DESCRIPTION OF THE PRIOR ART

In a prior art digital computer system having multiple binary data input lines, the digital computer sequentially observes the voltage level on each of the input lines on a repetitive basis. A real time counter keeps track of the time and, if a transition occurs on one of the input lines, the transition is stored in a register along with the time at which the transition occurred. Interrupt logic is provided which, upon the occurrence of the transition, causes the digital computer to process the information represented by the binary input data on that line, perhaps along with data on the other data input lines. If simultaneous transitions occur on the input lines, not all are likely to be recorded. Also, if a second transition in binary input data occurs prior to utilization of the prior data by the digital computer, the subsequent transition results in erasure or loss of the prior binary input data.

CITATION OF PATENT REFERENCES

U.S. Pat. No. 4,048,625 to Harris et al teaches the use of a first-time, first-out (FIFO) memory in conjunction with a RAM to provide improved data throughput in a printing control system. Input characters are applied to the FIFO memory and the characters to be printed are then sent to the RAM. The FIFO memory is said to increase the throughput of the print control system by the elimination of the use of "fill characters" or the alternative need to suspend the receipt of input characters. It appears that the FIFO memory allows input data received by the memory to be put out therefrom at a constant range even through the rate of receipt may vary.

U.S. Pat. No. 4,062,059 to Suzuki et al discloses a FIFO stack acting as a buffer and connected between first and second information processing units. A control circuit detects the full and empty states of the FIFO stack, and programmed information from the digital-computer central-processing unit establishes interrupt conditions with respect to the full and empty states of the FIFO stack.

U.S. Pat. Nos. 3,815,096 to Nahon; 3,952,289 to Baligant; 3,990,559 to Martin et al; 4,024,508 to Bachman et al; and 4,034,349 to Monaco et al teach or disclose FIFO memories, buffers, stacks, or control devices therefor such as empty/full flags for the registers in a FIFO stack.

U.S. Pat. Nos. 3,794,981 to O'Conner; 4,003,031 to Kashio all are of general interest with respect to sorting of information or its arranging.

SUMMARY OF THE INVENTION

The prior art technique for processing digital inputs has been unsatisfactory where input transitions occur with high frequency and where the transition times must be measured with high resolution. Also, the prior art techniques allow simultaneous input transitions occurring on different input lines to be lost in whole or in part. It is, or course, desirable to record all input transitions, whether they occur simultaneously with others or not.

The present invention provides improved processing of the binary input data supplied to a digital computer. The digital computer has a real time counter and a memory/address bus. The computer uses binary input data, comprising a plurality of bits of information, to generate output information in response to a program operating on the binary input data.

The improved processing of the binary input data to the digital computer comprises several steps. Upon a transition from one state to another of any of the bits of binary input data, a byte of binary input data containing the bit which has undergone transition is stored in an input holding register. Also, a byte indicative of the count of the real time counter as of the time of the transition is stored in a capture time holding register. The contents of the input holding register are transferred to a stack as a pending input data byte and the contents of the capture-time holding register are transferred to the stack as an input time byte indicative of a real time at which an input data transition occurred. The above sequence of steps is repeated upon a subsequent transition from one state to another of any of the bits of binary input data. This repetition of the sequence occurs without the pending input data byte, which was placed in the stack prior to the subsequent transition, being prevented from being utilized by the digital computer. The computer accesses pending input data bytes in the stack with the aid of the memory/address bus. The result is that the digital computer may operate on one or more pending input data changed binary input data and without disregard of simultaneous data transitions. The simultaneous transitions may occur and be recorded in the input holding register, which receives the plurality of bits of binary input data in parallel, rather than serially.

The invention increases the throughput of the digital computer and simplifies the interface between the inputs and the processing unit of the computer. A computer interrupt of a program is not ordinarily necessary each time an input data transition occurs because input data is retained in the stack and can be routinely accessed as required by a program. Also dedicated circuitry may be used to manipulate data held in storage in the stack. Reliability of data acquisition is improved and program performance time may be reduced substantially.

The invention may be more clearly understood by reference to the detailed description which follows and to the drawings.

BRIEF DESCRIPTION OF THE DRAWING

The drawing illustrates the input and output circuitry of a digital computer. The drawing does not show the central processing unit, memories, and master clock conventionally associated with digital computers, but these are understood to be connected directly or indirectly with the memory/address bus 10 shown in the drawing. The digital computer input/output circuitry depicted in the drawing and described herein is suitable for use in motor vehicle engine control applications and is described to some extent accordingly. Of course, the general purpose digital computer and input/output circuitry may be used, with or without modification, in many other applications as well.

DETAILED DESCRIPTION

With reference now to the drawing, it may be seen that the various blocks depicted therein are interconnected by lines, both narrow and heavy. The heavy lines indicate a plurality of electrical lead wires each of which may transmit binary electrical data. Unless otherwise indicated, the heavy lines may be regarded as comprising 16 separate electrical lead wires or lines. The narrow lines interconnecting the blocks in the drawing may be regarded as single electrical signal transmission lines.

In the drawing, there is shown a memory/address bus 10 that may be regarded as being connected to a central processing unit and its associated memories and master clock (not shown). The central processing unit typically includes a real time information transmission system, circuitry for the calculation and processing of the real time information received on the memory/address bus from input circuitry, and circuitry for use in performing any required calculations with the assistance of program information in the memory and any data that may be stored or placed therein as well. In addition to the binary input data obtained from the circuitry illustrated in the drawing, the digital computer may receive other input information used in performing calculations or control functions.

As a partial example of computer function in engine control, it may be assumed that the binary input data received by the central processing unit contains input information concerning current air/fuel ratio of a mixture being supplied to an internal combustion engine as well as the amount of air flow into the engine. This information may be placed on the memory/address bus 10 and may be used by the computer central processing unit (not shown) in the calculation of the duration of the fuel injection pulses that are to be used in controlling intermittently operated electromagnetic fuel injectors that supply fuel to the engine. The pulse width or duration represents the amount of open time for the injectors. The central processing unit would produce an output pulse for example, a change of a binary signal from a logic zero level to a logic one level, at the time a fuel injection from an injector is to begin and would produce a change from the logic one level to a logic zero level when the fuel injection is to terminate and the injector be shut off. Other engine functions, such as ignition timing and exhaust gas recirculation, also may be controlled by the computer and its program. The program in the central processing unit and memory that controls the processing of input data itself may be controlled by a master clock (not shown) have a frequency of, for example, 5 MHz. The performance of instructions by the computer may require at least one and perhaps several pulses of the master clock for execution, depending upon instruction complexity.

The input/output circuitry illustration in the drawing includes an input/output real time counter 11 having an input of secondary clock pulses that have a repetition frequency less than that of the master clock pulses. A divider circuit supplied with master clock pulses can be used to provide the reduced-frequency secondary pulse applied to the real time counter 11. If a 5 MHz master clock frequency is used, the secondary clock pulses may have a frequency of, for example, 5/12 MHz. In other words, the counter 11 receives one pulse at its input for every 12 pulses of the master clock associated with the central processing unit of the digital computer in the example given herein. The 16 bit count stored in the input/output real time counter 11 appears on each of its output lines 12, 15, and 80. The count on line 12 is supplied via line 13 to the memory/address bus 10 for use by other digital computer components as required. Also, the count on line 12 is applied via line 14 to the output stack controller 60. The count on line 15 is applied to a switch 24 and the count on line 80 is supplied to a number comparator 77.

The previously-described binary input data is available on line 16, which may comprise eight lines, although more or less may be used as required. The binary input data information bits on the eight lines 16 are applied to input latches 17. Except in connection with the generation of an interrupt, the binary input data in the input latches 17 is supplied on lines 22, eight in number, to an input holding register 20 having eight output lines 26 connected to a gate 30.

A single line 23 from the input latches 17 is connected to the switch 24. The switch 24 is gated by any input transition, that is, it is actuated by any change from one state to another of any of the bits of binary input data applied via lines 16 to the input latches 17. When such a transition occurs, the binary input data in the input latches 17 is transferred on lines 22 to the input holding register 20 and the count in the input/output real time counter 11 is transferred through the switch 24 and its associated lines 15 and 25 to a capture-time holding register 21. The capture-time holding register 21 thereby contains within it a count corresponding to the real time at which a transition took place in one of the bits of binary input data applied on lines 16 to the input latches, and the input holding register contains the entire eight bits of binary input data contained on lines 16 as of the occurrence of such transition. In other words, a byte of binary input data is placed in the input holding register whenever a transition occurs on one of the lines 16 from which such byte is obtained, and the capture-time holding register 21 stores the time of occurrence of the transition.

If the transition occurs in an input line that has been given interrupt capability, then the binary input data in the input latches 17 is supplied immediately to the memory/address bus 10 upon the next request for input data from the computer central processing unit. This occurs when lines 38 transitions that are detected by interrupt logic 37. When a data transition with associated interrupt capability occurs, a signal appears on line 39 and is applied to gates 30 and 31. Gate 30 has input lines 26 from the input holding register and gate 31 has input lines 27 from the capture-time holding register that allows transfer to the address decoding logic 50 via lines 40 and lines 41. The interrupt logic 37 also provides a signal, via a line now shown in the drawing, to the central processing unit so that a "service routine" or special program can be used to process the new input immediately.

In the absence of an interrupt condition, gate 30 is in a condition to allow transfer of the binary input data in the input holding register 20, via lines 32, to the pending-input-data side 35 of a first in/first out (FIFO) input stack 34. The FIFO input stack 34 also has an input-time side 36 which, from gate 31 and lines 33, receives the contents of the capture-time holding register, which contents are representative of the time at which a transition occurred in one of the bits of the binary input data stored in the pending-input-data side 35 of the stack.

As illustrated in the drawing, the FIFO stack 34 has six pending-input-data slots 35 and a corresponding six input-time slots 36. The pending input data and times in the upper slots are the last information placed in the stack, and the pending input data and input times stored at the bottom of the stack are the first placed therein. The pending input data is removed on lines 43 from the bottom of the stack and the associated input times are removed on lines 44 from the bottom of the stack. This information is applied to lines 42 connected to address decoding logic 50. The address decoding logic 50 interfaces with the memory/address bus 10 in relation to bus acquisition of input data and data transition times. Upon the placement by the computer central processing unit of the input circuitry address on the memory/address bus 10, the address decoding logic allows the data on lines 42 at the time to be placed on the memory address bus. An input stack controller 45 causes the pending input data in the bottom slot (1) of the side 35 of the FIFO stack to appear on lines 42 on one pulse or state of a pulse from the master clock. On the next state or occurrence of a master clock pulse, the input stack controller 45 causes the input time from the bottom slot (1) of the input-time side 36 of the FIFO stack to appear on lines 42.

The input stack controller 45 causes the information entering the FIFO stack 34 to progress from top to bottom as it progressively enters via lines 32 and 33 and exits via lines 43 and 44. Leads 47 connected to the various slots provide signals used to set the empty/full (E/F) flags 46 for each of the slots. As pending input data and input time information is used or removed from the slots via lines 43 and 44, the flags 46 are set to so indicate. FIFO input stacks and input stack controllers are, of course, well known in the art.

In the operation of the digital computer input processing thus far described, it is clear that simultaneous transitions of the binary input data on more than one of the lines 16 may occur without loss of any of the transition data. The binary input data on lines 16 is supplied as a byte of binary input data to the input holding register and then is transferred to the pending-input-data side 35 of the FIFO stack 36. A subsequent transition on one or more of the binary data input lines 16 causes the sequence of events previously mentioned to be repeated and adds another byte of binary input data to the pending-input-data side 35 of the FIFO stack. The respective times at which the transitions occurred in the bytes in the pending-input-data side of the stack are contained in the portion 36 of the stack. Both the pending input data and the associated input time are removed substantially simultaneously from the bottom slot of the stack on a first-in, first-out basis. The number of bytes of information in the data and time portions 35 and 36 of the FIFO stack at any one time depends upon the rate at which transitions occur in the binary input data and upon the rate at which data and associated time bytes are removed by the digital computer from the bottom of the stack. Preferably, a sufficient number of slots are provided in the stack so that no binary input data transitions are lost as a result of stack overflow.

With respect to the manner in which the output data from the computer is handled, reference is now made to the address decoding logic 52 interconnecting the memory/address bus 10 with the lines 53 associated with a self-sorting output stack 54. In basic function, the output circuitry receives binary output data from a digital computer central processing unit. The output data is supplied to a self-sorting stack in the output circuitry. Prior to its being put out to external circuitry or devices, the binary output data, stored as bytes within the stack, is time-ordered with the aid of a stack controller and other circuitry. This allows the digital computer to provide output data to the self-sorting stack without its central processing unit being required to implement the actual transmission of such data to external devices or circuitry. In other words, binary input data stored as pending output data bytes in a self-sorting stack are time-ordered by the self-sorting stack in accordance with output times assigned to the bytes of data by the digital computer central processing unit.

The self-sorting output stack 54 has a pending output data portion 55 containing six slots and a desired output time portion 56 containing a corresponding six slots. For each pending output data item in the portion 55, there is a corresponding desired output time for such output data contained in the portion 56 of the stack. Each slot has an E/F flag 57 associated with it which is used to set and control the time-ordering of information stored or removed from the stack 54. The output stack controller 60, which receives a five MHz master clock signal on line 61, continually goes through the stack to time-order the removal and utilization of the bytes of pending output data.

In the preferred form of the self-sorting output stack and related circuitry, the output stack controller 60 continually goes through the six slots of desired output times making successive comparisons of desired output times in two selected, and preferably adjacent, slots in the stack. The desired output times are binary numbers that subsequently will appear in the input/output real time counter 11. Upon each comparison of desired output times, the pending output data and desired output time closest to the real time are moved or switched to the compared-slot that is closer to the stack location from which pending output data is removed. If it is assumed that pending output data is always used or removed from the bottom slot of the self-sorting output stack and that pending output data and associated desired output times moves progressively from the upper slots toward the lower slots in the stack as output data is used or removed, then time ordering of the pending output data in the stack 54 may be accomplished by the output stack controller 60 and associated circuitry between changes in the count in the input/output real time counter 11.

There are twelve pulses from the master clock applied to the output stack controller for every change in count in the real time counter. Also, a maximum of twelve comparisons are required to interchange data in the various slots of the stack 54 for the purpose of completely time-ordering the desired output times and pending output data. Alternatively, the master clock pulses that occur between changes in count of the real time counter may be used with circuitry able to determine which of the pending output data bytes in the self-sorting stack has the earliest desired output time.

In the preferred time-sorting method, the output stack controller 60, having pulses from the master clock supplied on line 61, makes successive comparisons via lines 62, of the desired output times in selected adjacent pairs of slots in the output stack 54. For example, on a first master clock pulse a comparison would be made of the desired output time (6) with the desired output time (5). If the desired output time (5) is earlier than the desired output time (6) then the associated pending output data bytes of slots (6) and (5) are interchanged along with their desired output times. The output stack controller then causes a comparison to be made between the desired output time in slot (5) with that which is in slot (4) makes an interchange if necessary. Comparisons then are made with the desired output times in slots (4) and (3), slots (3) and (2), and slots (2) and (1) with pending-output-data and desired-output-time interchanges being made with each comparison as required to place the pending output data having the earliest desired output time in the slot (1) bottom location of the stack. A second pass through the stack assures that all of the pending output data is time sorted according to desired output time.

To make a comparison of the desired output times in adjacent slots in the portion 56 of the stack 54, the output stack controller 60, via leads 62, accesses the desired output times in the adjacent slots and subtracts from them the count in the real time counter, which is supplied to the output stack controller via lines 14. The difference between the desired output time in the upper slot involved in the comparison and the count in the real time counter is placed in a register 65, whereas the difference between the desired output time in the lower slot involved in the comparison and the real time count is placed in a register 67. The difference binary number temporarily placed in register 65 is received from the output stack controller 60 via lines 63, and the difference binary number in register 67 is received via lines 64. Lines 63 and 74, respectively, may also be used to set E/F flags 66 and 68 as the difference numbers are placed in the registers 65 and 67 and used by a number comparator 72. The binary numbers in the registers 65 and 67 are applied, respectively and via lines 70 and 71, to the number comparator 72 which produces a difference on lines 73 that indicates which of the desired output times in the compared slots of the stack was earlier in real time. If as a result of the comparison, a slot closer to the top of the stack was found to contain a desired output time earlier than that in the adjacent but lower slot in the stack, the desired output times and pending output data bytes associated therewith are interchanged for the reason previously described.

The desired output time in the bottom slot of the portion 56 of the self-sorting stack 54 is applied via lines 74 to a compare-time holding register 75. Upon the occurrence of a change in the count in the input/output real time counter 11, the binary number in this counter 11 is applied via lines 80 to a 16-bit number comparator 77. At this time a comparison is made with the desired output time on lines 76, the output of the compare-time holding register 75. The comparator 77 determines if there is correspondence between the real time count in the counter 11 and the desired output time on lines 76. If such correspondence exists, then a signal appears on line 81 and is applied to exclusive-OR gates 82. The exclusive-OR gates 82 compare each of the bits in the pending output data byte in the bottom slot of the portion 55 of the self-sorting stack 54 with each of the corresponding bits in the output data holding register 85. The current output data holding register 85 has within it those binary data output bits which represent what is being then outputted by the output latch 87 on its lines 88. The exclusive-OR gates 82, on a bit-by-bit basis, will change any of the bits in the binary data byte stored in the output data holding register 85 if these are different than that which is held in the pending output data slot at the bottom of the stack 54. Otherwise stated, exclusive-OR gates are used to change those bits held in the current-output-data-holding register to bits corresponding to those pending in slot (1) of the self-sorting output stack 54. The change occurs at the time the comparator 77 indicates that the pending output data byte in slot (1) of the stack 54 has a desired output time equal or corresponding to the real time represented by the binary number count in the real time counter 11.

Based upon the foregoing description of the invention, what is claimed is:

1. In a digital computer that has a real time counter and a memory/address bus and that uses binary input data comprising a plurality of bits of information to generate output information in response to a program operating on the binary input data, improved processing of the binary input data comprising the steps of:
   (a) upon a transition from one state to another of any of the bits of binary input data, storing in an input holding register a byte of binary input data containing the bit which has undergone transition;
   (b) storing in a capture-time holding register a byte indicative of the count of the real time counter as of the time of the transition;
   (c) transferring contents of the input holding register to a stack as a pending input data byte and transferring contents of the capture-time holding register to the stack as an input time byte indicative of a real time at which an input data transition occurred; and
   (d) repeating the above sequence of steps upon a subsequent transition from one state to another of any of the bits of binary input data without, as a result of such repetition of steps, preventing the pending input data byte placed in the stack prior to the subsequent transition from being utilized by the digital computer with the aid of the memory/address bus;
   whereby, the digital computer may operate on one or more pending input data bytes, and the individual bits therein, without loss of changed binary input data and without disregard of simultaneous data transitions.

2. Improved processing of digital computer binary input data as in claim 1, including the step of:
   for transitions of a predetermined bit or combination of bits of binary input data, making such bit or bits accessible to the memory/address bus without such bit or bits prior to such accessibility being required to pass through the stack.

3. Improved processing of digital computer binary input data as in claim 1, including the step of:
   allowing transitions of a predetermined bit or combination of bits of binary input data to cause an input data interrupt such that the changed input data is immediately accessible to the memory/address bus when addressed thereby.

4. Improved processing of digital computer binary input data as in claim 3, including the step of:
   where there is the input data interrupt, preventing the changed input data from being transferred to the stack.

5. Improved processing of digital computer binary input data as in claim 1, including the step of:
   storing a plurality of pending input data bytes in the stack.

6. Improved processing of digital computer binary input data as in claim 5, including the step of:
   making the pending input data bytes in the stack accessible to the memory/address bus on the basis of the first input data byte placed in the stack being the first input data byte used or removed from the stack.

7. Improved processing of digital computer binary input data as in claim 5, including the step of:
   making the pending input data bytes retained in the stack accessible to the memory/address bus at a predetermined location in the stack.

8. Improved processing of digital computer binary input data as in claim 7, including the step of:
   making the pending input data bytes reach the predetermined stack location on a time-ordered basis.

9. Improved processing of digital computer binary input data as in claim 8, including the step of:
   making the pending input data bytes reach the predetermined stack location in chronological order of times at which input data transitions occurred.

10. Improved processing of digital computer binary input data as in claims 5, 6, 7, 8 or 9, including the step of:
    for transitions of a predetermined bit of combination of bits of binary input data, making such bit or bits accessible to the memory/address bus without such bit or bits prior to such accessibility being required to pass through the stack.

11. Improved processing of digital computer binary input data as in claims 5, 6, 7, 8 or 9, including the step of:
    allowing transitions of a predetermined bit or combination of bits of binary input data to cause an input data interrupt such that the changed input data is immediately accessible to the memory/address bus when addressed thereby.

12. Improved processing of digital computer binary input data as in claims 5, 6, 7, 8 or 9, including the steps of:
    allowing transitions of a predetermined bit or combination of bits of binary input data to cause an input data interrupt such that the changed input data is immediately accessible to the memory/address bus; and preventing the changed input data from being transferred to the stack.

* * * * *